May 30, 1967 F. SINGER ETAL 3,322,052
PHOTOGRAPHIC SHUTTER
Filed Jan. 19, 1965 3 Sheets-Sheet 1

United States Patent Office 3,322,052
Patented May 30, 1967

3,322,052
PHOTOGRAPHIC SHUTTER
Franz Singer and Helmut Müller, Munich, Germany, assignors to Compur-Werk Gesellschaft mit beschrankter Haftung & Co., Munich, Germany, a firm of Germany
Filed Jan. 19, 1965, Ser. No. 426,611
Claims priority, application Germany, Jan. 23, 1964, C 31,949
8 Claims. (Cl. 95—63)

This invention relates to a photographic shutter, and more particularly to a shutter which has a main driving spring or master spring to drive the shutter blades through their opening and closing movements when the shutter is set for exposures of any speed, and an auxiliary or supplementary driving spring which assists the main driving spring when the shutter is set for one or more relatively high speed or relatively fast exposures.

An object of the invention is the provision of a generally improved and more satisfactory shutter of this kind.

Another object is the provision of such a shutter so constructed that both springs are tensioned or cocked by a continuous cocking movement in one direction, without any abrupt increase in resistance during this cocking movement.

Still another object is the provision of such a shutter having a particularly simple, sturdy, and compact construction.

A further object is the provision of such a shutter in which the means for selectively rendering the auxiliary spring effective or ineffective, as desired, employs simple elements which for the most part are already available in the shutter construction.

These and other desirable objects may be attained in the manner disclosed as an illustrative embodiment of the invention in the following description and in the accompanying drawings forming a part hereof, in which.

The present invention is here illustrated and described, by way of example, in a shutter of the objective type, having the usual familiar annular casing or housing surrounding the central exposure aperture which is closed (except during the making of an exposure) by a plurality of pivoted shutter blades. However, those skilled in the art of photographic shutters will readily recognize that the broader features and principles of the present invention may be applied to shutters of other types, such as curtain shutters, also called focal plane shutters. The objective shutter here shown as an example is illustrated only partially, to such extent as is necessary to an understanding of the invention, the parts not illustrated or described being of the usual conventional construction.

Figure 1:
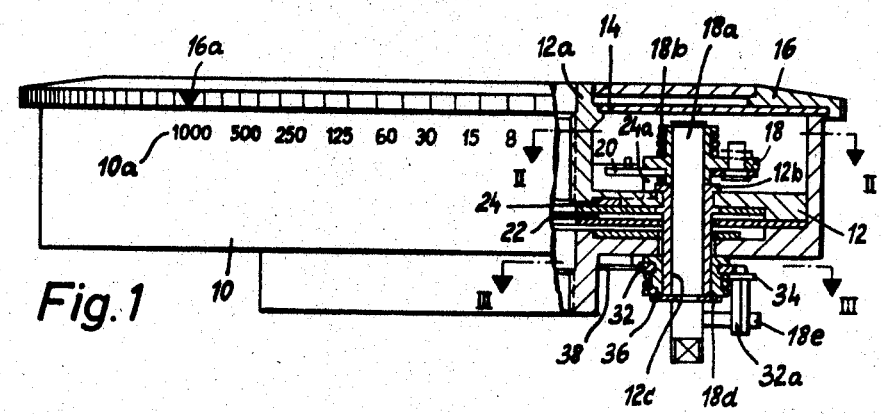
FIG. 1 is an edge view or elevational view of one form of shutter according to the present invention, with parts broken away and parts in section, the section being taken substantially on the line I—I of FIG. 2.

The shutter comprises, for example, a housing or casing of annular shape, indicated in general at 10, having within it the usual annular mechanism mounting plate 12, on which many of the moving parts of the mechanism are mounted directly or indirectly. The mounting plate 12 also carries the front lens tube 12a, of annular form, projecting forwardly from the inner edge of the plate 12. Near the front of the shutter, rotatable on a shoulder on the lens tube 12a, is the internal shutter speed control ring 14 of annular shape, provided with a control cam edge partially shown at 14a. This internal control ring 14 is coupled for rotation with an outer or external shutter speed setting ring 16, manually accessible at the front of the camera and angularly adjustable to set the shutter for any desired shutter speed within its range of speeds. A pointer and a shutter speed scale associated with the housing element 10 and the setting ring element 16 serve to show the position of orientation to which the parts should be set, to produce any desired shutter speed. The scale can be on either element and the pointer on the other element, as well understood in the art. In the particular structure illustrated as an example in FIG. 1, the shutter speed scale is marked on the stationary housing or casing 10, as shown at 10a, and the pointer or index mark is on the setting ring 16, as shown at 16a. In the conventional way, the numerals of the scale 10a represent the denominators of fractions whose numerator is understood to be one, representing fractional parts of a second which constitute the nominal durations of the respective exposures. Thus if the pointer or mark 16a is set opposite the numeral 1000 on the scale 10a, the shutter is set for an exposure of $\frac{1}{1000}$ of a second, and if the ring 16 is turned to bring the mark 16a opposite the numeral 8 of the scale 10a, the shutter is then set for an exposure of $\frac{1}{8}$ of a second, and so on.

The shutter is provided with a main driving member, frequently known in the art as a "master member," illustrated at 18 and fixed to a shaft 18a which is rotatable in a bearing bushing 12b fixed to the mechanism mounting plate 12. A main driving spring or master spring 18b surrounds the forward hub-like end of the master member 18 and bears at one end against a pin on the master member and at the other end against a fixed pin in the shutter housing. It tends to turn the master member 18 counterclockwise.

The shutter blades 22, of any convenient number, are pivotally mounted in the conventional way to swing across the exposure aperture (defined by the front lens tube 12a and the corresponding rear lens tube) in overlapping relation to each other, to close the exposure aperture against entrance of light, or to swing away, out of the exposure aperture, to admit light to make an exposure.

There may be, for example, five blades, such a number of blades being quite common in objective shutters, but for the sake of clarity only one blade is here shown. All of the blades are pivotally connected in the usual manner to a blade ring 24 which rotates concentrically with the optical axis, and which has a radial arm provided with a lug or ear 24a cooperating with a notch near one end of the link 20 which is pivotally connected at its other end to the master member 18. When the master member performs a running down movement in a counterclockwies direction from its fully tensioned or cocked position shown in FIG. 2, it first pushes the link 20 leftwardly so that the shoulder at one end of the notch in the link engages the lug 24a to push the blade ring 24 in a counterclockwise direction to open the shutter blades. As the counterclockwise rotation of the master member 18 continues, it pulls rightwardly on the link 20, so that the shoulder at the opposite end of the notch now pulls rightwardly on the lug 24a, moving the blade ring 24 back in a clockwise direction to close the shutter blades. A light spring 25 serves to keep the link 20 in proper engagement with the lug 24a. All of this is conventional and well understood in the art, and need not be further described.

The above mentioned shaft 18a, to which the master member 18 is fixed, extends out through a rear wall of the shutter, and into the body of the associated camera on which the shutter is mounted. Within the camera body, there is the conventional mechanism for turning the shaft in a clockwise direction when viewed as in FIG. 2, to tension or cock the master member, this mechanism within the camera body usually being associated with the film winding or film transport mechanism, so that the master member is automatically tensioned by the act of winding the film. When the shaft is turned in a clockwise direction from the run down position to the fully tensioned or cocked position, one end of the latch lever 26, pivoted on a fixed pivot in the shutter housing, drops behind the shoulder 18c of the master member and thus latches the master member in the tensioned position shown in FIG. 2.

When the latch 26 is released, the master spring 18b can turn the master member in a counterclockwise direction, to open and close the shutter blades through the action of the link 20, as already briefly described above. During the running down movement of the master member, this same portion 18c may engage with the usual conventional retarding or delaying mechanism, to slow the running down movement of the master member in order to time the exposure to the desired duration. The latch lever 26 has a second arm 26a which coacts with the arm 28a of the shutter trip lever 28 mounted within the shutter casing as shown. The second arm 28b of the trip lever 28 passes out through an opening in the rear wall of the shutter housing and is connected to the trip device of the camera in known fashion. When the usual shutter trip member or trigger member on the camera is operated, the trip lever 28 will be swung in a clockwise direction against the force of its return spring 30, whereby the arm 28a will operate the arm 26a of the latch lever 26, to release the opposite end of the latch lever from the master member 18, allowing the master member to begin its running-down movement in a counterclockwise direction to open and close the shutter blades.

The above mentioned master member 18 serves to open and close the shutter blades during all exposures of all durations or speeds within the range of the shutter, and in each case the main driving spring or master spring 18b serves to power or drive the master member at least partially. For relatively slow shutter speeds, the main driving spring 18b constitutes the only driving power for the master member. For one or more of the relatively fast shutter speeds, a supplementary or auxiliary driving spring also cooperates with the master member to give it additional power for driving it at a faster rate. In the construction here shown as an example, the auxiliary or supplementary power spring is effective only for the fastest shutter speed of $1/1000$ of a second, and is ineffective when the shutter is set for any of the slower speeds, from $1/500$ of a second to the slowest shutter speed.

The auxiliary spring mechanism is best shown in FIGS. 1 and 3–8. The mechanism includes a sleeve-like hub or bearing member 36 freely rotatable on the rear end of the bushnig 12b which, as above mentioned, is rigidly fixed to the mounting plate 12 of the shutter. The sleeve 36 is held against axial displacement by the split ring 18d on the shaft 18a. Surrounding the sleeve 36 and staked or otherwise firmly fastened to it, is a ring 32 having a rearwardly projecting lug or arm 32a which overlaps a radial driving pin 18e fixed to the shaft 18a. The auxiliary or supplementary driving spring is shown at 34, and is coiled around the sleeve 36, with one end of the spring 34 engage with the arm 32a and with the other end engaged with a fixed pin 10b in the casing. The spring tends to turn the members 32, 36 in a counterclockwise direction when viewed from the front, as in FIGS. 3–8.

Figure 3:
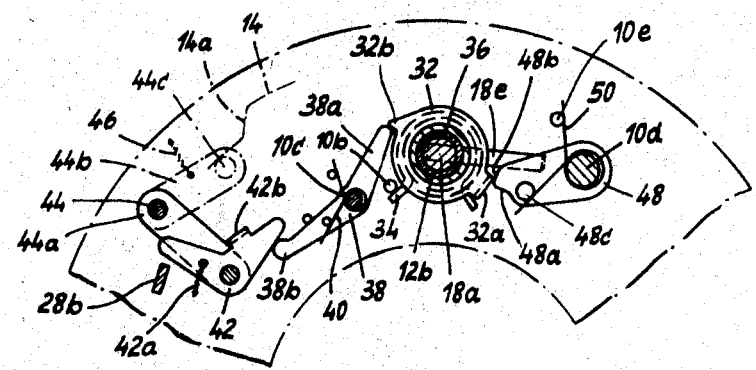
FIG. 3 is a fragmentary transverse section through the shutter parts underlying and further to the rear of those shown in FIG. 2, the section being taken approximately on the line III—III of FIG. 1, these parts also being shown in the position which they assume when the shutter is tensioned or cocked ready for an exposure of $\frac{1}{1000}$ of a second.
Figure 8:
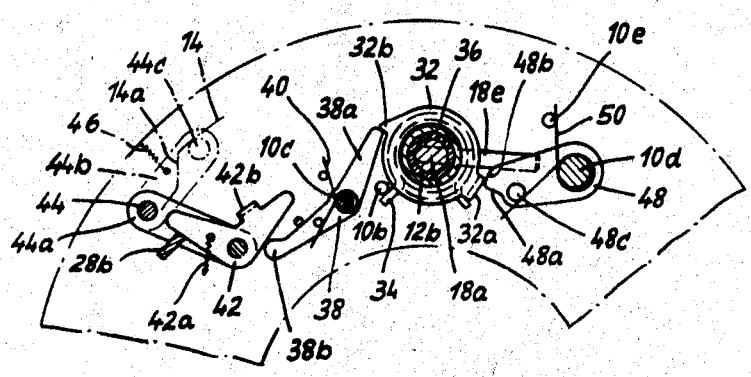
FIG. 8 is a view similar to FIG. 3, with the parts in tensioned position ready for a slower exposure, such as an exposure of $\frac{1}{500}$ of a second.

When the auxiliary spring 34 and its bearing members 32, 36 are in the tensioned or cocked position shown in FIGS. 3 and 8, they are held against counterclockwise movement by a double-armed auxiliary latch lever 38 rotatably mounted on a pin 10c projecting rearwardly from the rear wall of the shutter casing 10. A spring 40 urges the latch member 38 in a clockwise direction, tending to move the first arm 38a thereof into latching engagement behind a latching nose or shoulder 32b on the bearing member 32. The second arm 38b of the latching lever 38 cooperates with a transmission lever 42 which is freely pivoted on a lever arm 44a and urged in a counterclockwise direction on its pivot by a light spring 42a, which tends to keep the lever 42 in a limit position determined by engagement of an ear 42b thereon with an edge of the lever 44a on which it is pivotally mounted. The lever arm 44a is fixed to a shaft 44 which extends forwardly through and is rotatable in a bearing in the rear wall of the shutter casing. Near its forward end, the shaft 44 is fixed to a second arm 44b urged in a counterclockwise direction by a light spring 46, tending to keep the pin 44c on the second arm 44b in engagement with the effective edge of the cam 14a on the shutter speed control ring 14.

Rotatably mounted on the fixed pin 10d which projects from the rear wall of the shutter casing, is a pawl 48 biased in a clockwise direction by a spring 50, one end of which bears against the fixed pin 10e projecting from the rear wall of the shutter, and the other end of which bears against a pin 48c on the pawl. The left end of the pawl is formed with a tensioning or cocking nose 48a and with a bearing surface 48b, both of which cooperate with the lug or ear 32a on the auxiliary bearing member 32, in the manner further described below. The pin 48c projects forwardly from the member 48, in order to contact with the spring 50, and also projects rearwardly from the member 48, into the plane of rotation of the pin 18e on the shaft 18a, in order to make contact with and be driven by this pin 18e, as further mentioned below.

The construction operates as follows: Let it be assumed that the shutter is in the released or run-down condition following the taking of a photograph at a speed of $1/60$ of a second. Consequently, the master member 18 and the master spring or main driving spring 18b will be run down or relaxed, but the auxiliary driving spring 34 and its bearing member 36 will still be in tensioned or cocked position because, as will further appear below, they are not released during the making of an exposure at a speed of $1/60$ of a second, and hence they remain fully cocked during such an exposure.

Before a fresh photograph can be taken, the shutter must be tensioned or cocked, which is done by turning the shaft 18a in a clockwise direction (viewed as in FIG. 2) by means of the conventional mechanism within the associated camera body, as mentioned above. This brings the master member 18 to the tensioned position shown in FIG. 2, where the latch 26 drops behind the shoulder 18c on the master member, holding it in tensioned position until it is released for an exposure.

Let it be assumed that the next photograph is to be taken at a shutter speed of 1/1000 of a second. The setting ring 16 is turned manually to bring the index mark 16a opposite the graduation 1000 of the scale 10a. This brings a portion of the cam 14a opposite the pin 44c on the lever arm 44b, in such a way as to swing this lever arm clockwise from the position shown in FIG. 8 to the position shown in FIG. 3, so that the other lever arm 44a connected to the lever arm 44b by the shaft 44 is also swung in a clockwise direction. This serves to position the transmission lever 42 in the position shown in FIG. 3 rather than the position shown in FIG. 8, so that the transmission lever 42 will be effective to trip or release the auxiliary spring.

Figure 4:
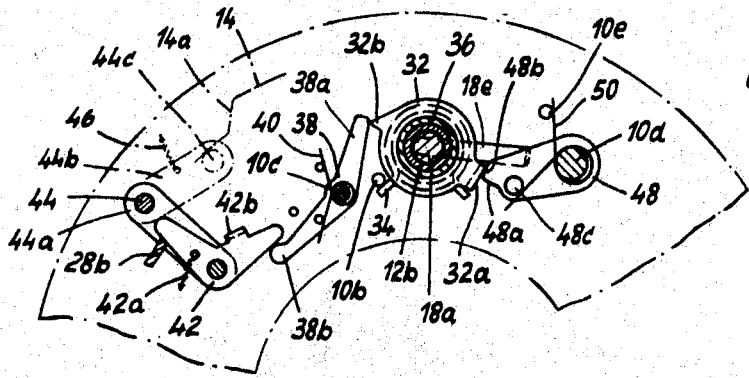
FIG. 4 is a view similar to FIG. 3 showing the parts in an intermediate position during the early stages of a running-down or exposure-making movement.

When the shutter trip lever 28 is moved in a clockwise direction to initiate the exposure, its arm 28b engages the transmission lever 42 at the commencement of the trip motion and carries it along in a clockwise direction. This transmission lever 42, in turn, engages the arm 38b of the auxiliary latch lever 38, moves it in a counterclockwise direction against the force of its light spring 40, and thereby releases the opposite end 38a of the latch from the nose or shoulder 32b of the supplementary spring bearing member 32. Under the influence of the supplementary spring 34, the bearing member 32 can now begin to turn in a counterclockwise direction or running down direction, but can only turn a slight distance in this direction, because after a slight movement the arm 32a on the bearing member 32 comes into contact with the pin 18e on the shaft 18a, thus being prevented from turning any further in a counterclockwise direction until the shaft 18a itself is free to turn. This position of the parts is illustrated in FIG. 4.

Continued motion of the shutter trip lever 28 in a clockwise direction causes the arm 28a of this trip lever to engage the arm 26a of the main latch 26, thereby moving this latch 26 in a counterclockwise direction to release the master member 18, which is now free to run down in a counterclockwise direction under the influence of the main or master spring 18b. The release of the master member 18 occurs at a very slight interval after the release of the auxiliary spring bearing member 32, so that by the time the master member itself is released, the arm 32a of the auxiliary spring mechanism is already bearing against the pin 18e. Thus at the time the master member is released, the auxiliary spring is tending to turn the master member in a counterclockwise direction, as well as the main master spring 18b, so that the full power of both springs is available to drive the master member very rapidly in a running-down direction, thereby rapidly opening and closing the shutter blades to make a fast exposure of the desired duration of 1/1000 of a second.

The running down movement of the master member serves, by means of the link 20, to turn the blade ring 24 first in a counterclockwise direction and then in a clockwise direction, to open and close the shutter blades. At the conclusion of the exposure, the master member comes to rest in its run-down position not here illustrated but turned approximately 140 degrees in a counterclockwise direction from the position illustrated in FIG. 2. The auxiliary spring 34 and its associated members 32 and 36 have also run down (because this was an exposure at the fast speed of 1/1000 of a second, rather than at a slower speed) from the tensioned position shown in FIG. 3 to the relaxed or run-down position shown in FIG. 5.

Figure 5:
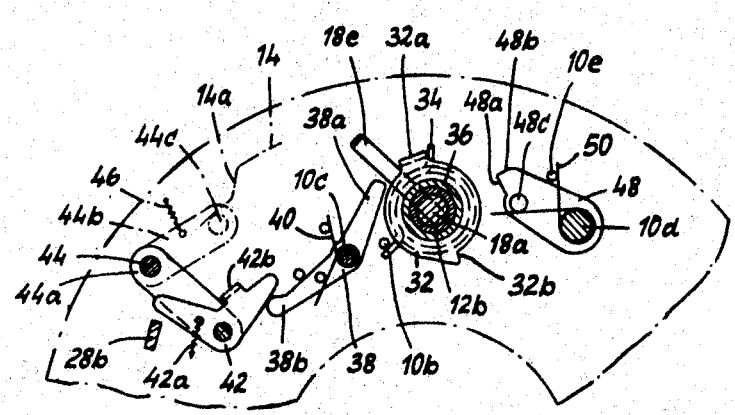
FIG. 5 is a similar view showing the parts in their completely run down or rest position, at the end of an exposure.

The shutter must now be tensioned or cocked ready for the next exposure. This is done, as above explained, by turning the shaft 18a in a clockwise direction when viewed from the front of the shutter as in FIGS. 2–8, and the turning of the shaft serves to tension both the main or master spring 18b, and also the auxiliary or supplementary spring 34 if the latter has previously run down during the making of a relatively high speed exposure. When both springs have run down, the parts come to rest with the arm 32a of the auxiliary driving mechanism in contact with the pin 18e of the main driving mechanism, as shown in FIG. 5. Hence, right at the beginning of the clockwise tensioning movement of the shaft 18a, the parts 32, 36 of the auxiliary mechanism will be carried along in a clockwise direction, thus tensioning the auxiliary spring 34 simultaneously with tensioning the main or master spring 18b. Thus the resistance of both springs must be overcome during the entire tensioning operation, with the result that there is no sudden or abrupt increase in the tensioning resistance at an intermediate point of the tensioning motion. In certain prior constructions, the tensioning of an auxiliary spring does not commence until an intermediate point in the tensioning of the main or master spring, with the result that an increased resistance is suddenly felt at this intermediate point, sometimes leading the operator to assume that he has reached the end of the tensioning movement, so that he stops the tensioning movement at an intermediate point, thereby causing faulty operation. This is avoided by the present construction, because of the smooth continuous resistance throughout the entire range of tensioning movement, without any noticeable abrupt change in the tensioning resistance, even through the resistance does increase as the tensioning progresses.

Figure 2:
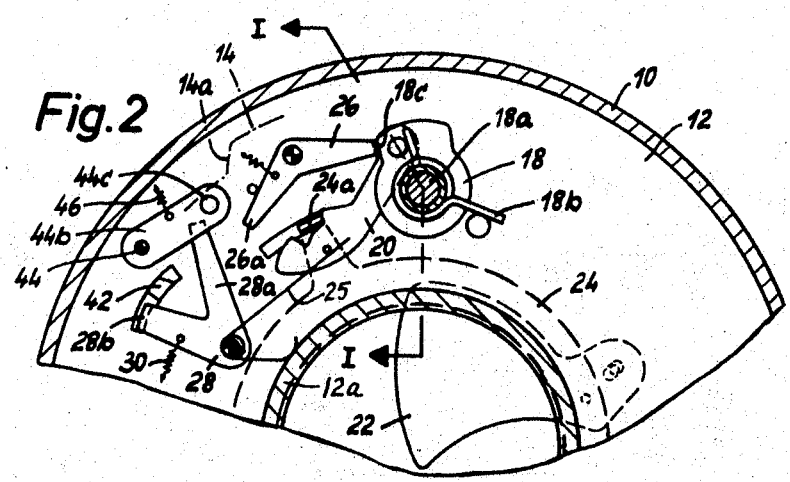
FIG. 2 is a fragmentary cross section through a portion of the shutter, the section being taken transverse to the optical axis substantially on the line II—II of FIG. 1, the parts being shown in the position which they assume when the shutter is tensioned or cocked ready for an exposure at a relatively high speed, such as a speed of $\frac{1}{1000}$ of a second.
Figure 6:
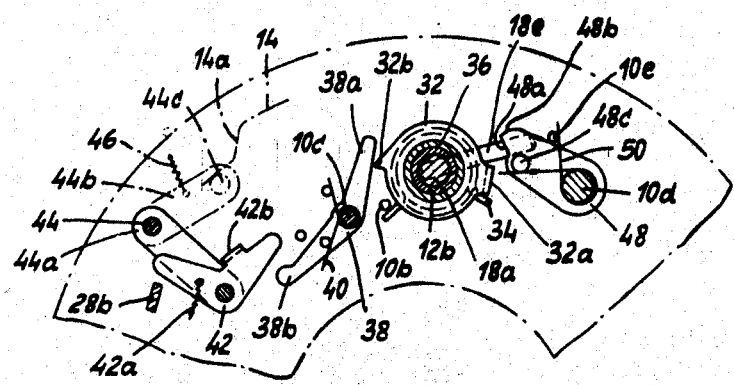
FIG. 6 is a similar view showing the parts at an intermediate position during the tensioning or cocking movement.
Figure 7:
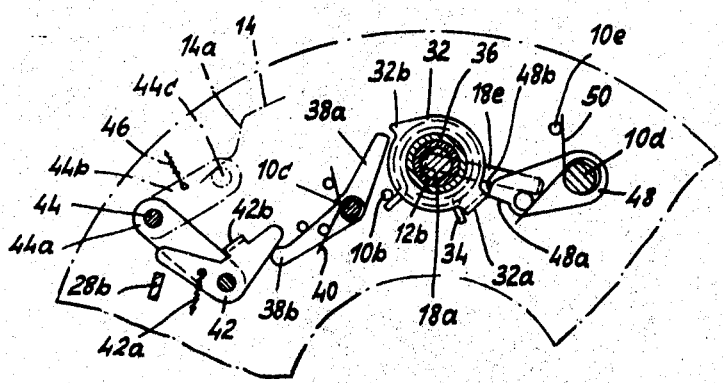
FIG. 7 is a view similar to FIG. 6, but with the tensioning or cocking movement somewhat further advanced.

In the couurse of the tensioning motion, when the parts reach approximately the intermediate position shown in FIG. 6, the driving pin 18e on the shaft 18a engages the pin 48c on the pawl or lever 48, and then positively propels the lever 48 in a counterclockwise direction on its pivot 10d, against the force of its light restoring spring 50. The cocking or tensioning nose 48a on the lever 48 then engages the lug 32a on the bearing member 32 of the auxiliary spring, and during the further travel in the tensioning direction, the lever 48 serves to turn the bearing member 32 to advance it to a slight angle beyond the position determined by the pin 18e, separating the ear 32a slightly from the pin 18e as seen in FIG. 7, and advancing the member 32 slightly beyond the position where the latch 38a will drop behind the shoulder 32b, as also seen in FIG. 7. Then the nose 48a slips off of the ear 32a, allowing the spring 34 to turn the bearing member 32 back in a counterclockwise direction slightly from the position shown in FIG. 7 to the position shown in FIGS. 3 and 8, where the shoulder 32b of the bearing member engages the end 38a of the latch lever 38, preventing further counterclockwise rotation and holding the auxiliary spring mechanism in its tensioned or cocked condition until it is released for making another fast exposure. The edge 48b of the pawl or lever 48 now bears against the smooth side of the ear 32a, as seen in FIGS. 3 and 8, so that it will not interfere with the return movement of the member 32 when released for making an exposure. When the tensioning lever on the camera body is released at the end of the tensioning movement, the tensioning shaft 18a and the main driving member or master member 18 can move back to a slight extent under the influence of the master spring 18b, until the latching shoulder 18c of the master member makes engagement with the end of the main latching lever or pawl 26 which has already dropped to latching position, as shown in FIG. 2. At the completion of the tensioning or cocking operation, the driving pin 18e on the tensioning shaft 18a is in a position slightly away from the pin 48c on the pawl 48, as seen in FIGS. 3 and 8.

The tensioning procedure is the same, regardless of whether the next exposure is to be a high speed exposure involving the use of the auxiliary or supplementary spring driving means, or whether it is to be an exposure at a slower speed, not involving the auxiliary spring driving means. In either case, both the main spring and the auxiliary spring are fully tensioned at the end of the tensioning operation, so that the spring power means is axailable for producing any desired kind of an exposure, and it is not necessary for the operator to make up his mind as to what speed of exposure he will use, until after the tensioning has been completed. If, however, the previous exposure was at a slower shutter speed rather than the maximum speed, the auxiliary spring mechanism was not released during the previous exposure and therefore it was already in tensioned position at the conclusion of the previous exposure. In such a situation, the tensioning procedure affects only the master member and the master spring, without affecting the already tensioned position or condition of the auxiliary driving means. But in any event, the end result is the same, both the main and the auxiliary driving means being fully tensioned at the end of the tensioning operation, regardless of the speed of the preceding exposure and regardless of the speed of the next exposure which is to follow.

Assuming that the parts are fully tensioned, if the next exposure is to be made at a speed less than the maximum speed, for example, at a speed of 1/500 of a second, the setting ring 16 is turned until the index mark 16a is opposite the graduation 500 of the scale 10a. This brings another part of the cam 14a (farther away from the optical axis) opposite the pin 44c of the lever 44b, so that under the influence of the spring 46 the lever 44b and with it the lever 44a may now swing in a counter-clockwise direction from the position shown in FIG. 3 to the position shown in FIG. 8. This moves the pivot of the transmission lever 42 to a position where the transmission lever cannot operate the latch lever 38 to release the auxiliary latch. Thus when the release lever 28 is swung in a clockwise direction to release or trip the shutter for an exposure, the ear 28b may contact the transmission lever 42 and turn this lever to some extent, but the transmission lever will not release the auxiliary latch. The release lever portion 28a will, however, release the main latch 26, thereby releasing the master member 18 to perform its running down movement to open and close the shutter blades under the influence only of the main or master spring 18b, without the additional power or force of the auxiliary spring 34. Thus the opening and closing movement of the shutter blades will not be performed as fast as it was when both springs were employed. For still slower shutter speeds, the action is similar (using only the main or master spring 18b) except that the rotation of the master member is slowed down to the desired extent, by contact with the conventional retarding or delaying mechanism controlled by suitable cam surfaces on the cam member 14, all as well understod in the art.

A second embodiment of the invention, representing a modification of the embodiment above described, will now be described with reference to FIGS. 9 and 10 of the drawings. In the second embodiment, most of the parts are the same as in the first embodiment, are indicated by the same reference numerals, and operate in the same way, so that no further description thereof is necessary, and the description may be confined to the parts which differ.

In this second embodiment, the transmission lever 42 of the first embodiment is eliminated, and is replaced by a transmission lever 52 pivoted on a fixed pivot 10f projecting from the rear of the casing. A control pin 52a on the transmission lever extends rearwardly to engage with an edge of the latch lever 54 which is also mounted for rotation on the same pin 10f, back of the lever 52. The latching lever 54 has a nose 54a for engaging the latching shoulder 32b of the auxiliary spring member 32, to hold this member 32 in its tensioned or cocked position, and also has a spring 55 which tends to swing the latching lever 54 counterclockwise into latching position. The transmission lever 52 is biased in a counterclockwise direction by a light spring 52b.

In addition to extending rearwardly to engage the latch lever 54, the control pin 52a on the transmission lever 52 also extends forwardly, through a slot 10g in the rear wall of the shutter casing or housing 10, to engage with an edge of the bulb exposure locking lever or B-locking lever 56, of known form, mounted for rotation on the same pivot pin on which the main latch 26 is mounted. A light spring 56a biases the B-locking lever 56 in a counterclockwise direction, and lightly holds the ear or lug 56b thereof in engagement with the edge of the shutter speed control cam 14. The speed control cam has an inclined portion 14b which, acting upon the ear 56b, swings the B-locking lever 56 in a clockwise direction, against the force of the spring 56a, when the speed control cam 14 is turned from one of the lower speed positions to the highest speed position for an exposure of 1/1000 of a second. To the right of the inclined portion 14b, there is a concentric portion 14c of the control cam, of smaller radius, which is opposite the lug 56b of the bulb locking lever 56 when the shutter is set for speeds from 1/500 of a second to one second. Further to the right of the concentric portion 14c, there is another inclined portion 14d which leads to a cam surface of still smaller radius, and which passes the lug 56b when the speed control cam 14 is turned to a position beyond the one second position, for making a bulb or B exposure, thus allowing the spring 56a to turn the B-locking lever 56 still further in a counterclockwise direction, until the nose 56c thereof is in position to engage the edge 18c of the master member 18 at an intermediate point in its running down movement, and to stop or hold such movement temporarily in a position wherein the shutter blades are fully open.

The action of the lever 56 in producing a bulb or B exposure is well understood in the art and is not part of the present invention, so need not be further described. The second embodiment of the present invention merely takes advantage of the existence of the bulb lever 56, if and when the shutter is of the kind which has such a lever, and the present invention utilizes the bulb lever 56 in order to control the unlatching of the auxiliary spring power means, without affecting the function or operation of the lever 56 in connection with bulb exposures. The utilization of the bulb lever for controlling the unlatching of the auxiliary spring means enables a simplification of the construction and elimination of some of the parts which would otherwise be necessary to provide for the unlatching of the auxiliary spring means when an exposure is to be made at the fast speed of 1/1000 of a second and to insure that the auxiliary spring means is not unlatched when an exposure is to be made at a slower speed.

Figure 9:
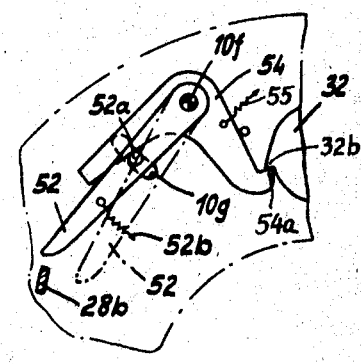
FIG. 9 is a fragmentary view of a modified construction, illustrating an alternative construction of the parts shown near the left hand side of FIGS. 3–8.
Figure 10:
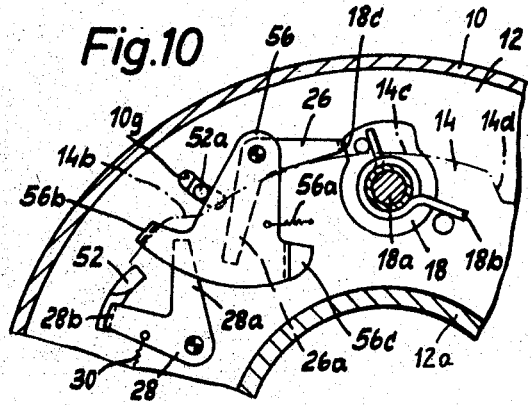
FIG. 10 is a view similar to FIG. 2, illustrating other portions of the same modified or alternative construction shown in FIG. 9.

The parts are of such size and relationship that when the shutter is set for an exposure of 1/1000 of a second (the cam 14 then being in the position shown in broken lines in FIG. 10) the B-lever 56 is held in the position illustrated in FIG. 10, and in this position the left edge of the lever 56 acts on the pin 52a of the transmission lever 52, to hold the transmission lever in the position shown in full lines in FIG. 9. In this position, the sloping or cam-shaped free end of the transmission lever 52 lies in the path of travel of the lug or ear 28b on the release lever 28, so that when the release lever is turned in a clockwise direction to release the shutter for making an exposure, the ear 28b will engage the lever 52 and will cam this lever in a clockwise direction from the full line position shown in FIG. 9. This clockwise swinging of the lever 52 will be transmitted through the pin 52a to the latch lever 54, likewise swinging the latch lever in a clockwise direction to release the nose 54a from the shoulder 32b of the auxiliary spring bearing member 32, so that the latter can begin to run down in a counterclockwise direction under the influence of the auxiliary spring 34, in exactly the same way as described in connection with the first embodiment.

However, when the shutter is not set for an exposure of 1/1000 of a second but is set for any slower exposure from 1/500 of a second to one second, or for a B exposure, then the ear 56b of the bulb lever 56 will be on a lower or smaller radius part 14c or 14d of the cam 14, so it will be positioned somewhat counterclockwise from the position shown in FIG. 10. Therefore the spring 52b of the transmission lever 52 can swing the transmission lever in a counterclockwise direction (keeping the pin 52a against the edge of the lever 56) and the transmission lever 52 will assume a position such as that shown in broken lines in FIG. 9. In this position, it is out of the path of travel of the lug 28b on the trip lever 28. Therefore, when the trip lever is operated to initiate an exposure, it will not engage the transmission lever 52, and consequently will not serve to release the auxiliary latch lever 54. The arm 28a of the trip lever 28 will, however, engage the main latch lever 26 and release the main latch, just as in the first embodiment of the invention, and this will occur regardless of the position of the transmission lever 52.

With this construction, when the shutter is equipped with a bulb control lever such as shown at 56, it is possible to utilize the simple parts 52 and 54 in conjunction with the B lever, and to eliminate the parts 38, 42, 44a, and 44b of the previous embodiment, likewise eliminating the special cam portion 14a on the cam 14 which was previously needed for operating the pin 44c of the lever 44b. Thus an advantageous simplification is achieved.

In both embodiments of the invention, there is a shutter provided basically with a known form of master member and master spring for driving the blades through their opening and closing movements, and further provided with an auxiliary or supplementary driving spring which is released for operation only when a relatively high speed exposure is to be made, the auxiliary spring remaining tensioned or cocked during exposures of slower speed. Moreover, the mechanism is designed to move the auxiliary spring parts, during a tensioning operation, slightly beyond the fully tensioned position, thus insuring that the latch for the auxiliary spring mechanism will always drop into place and hold the auxiliary spring mechanism latched securely in its tensioned position. The frictional resistance of the auxiliary latch does not have to be overcome when making exposures in the range wherein the auxiliary spring mechanism is not used. Also, the lost motion achieved near the end of the tensioning or cocking operation, by the use of the pawl 48, provides for a continuously increasing torque during the cocking or tensioning of the shutter. This continuous increase in torque has the advantage that the user does not feel any changeover or any abrupt change in the power exertion necessary for cocking or tensioning the shutter, regardless of whether one or both springs are to be tensioned, and thus is not misled into thinking that he has completed the tensioning operation when in fact he has only partially completed it.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic shutter comprising a main driving member mounted for rotation in a forward direction to make an exposure and for rotation in a reverse direction to condition said member ready for a subsequent exposure, a main spring for driving said member, an auxiliary spring selectively effective to assist in driving said member, said auxiliary spring being operatively connected to a rotary bearing sleeve rotatable concentrically with said main driving member, a releasable main latch for holding said main driving member and said main spring in a tensioned position, a releasable auxiliary latch for holding said bearing sleeve and said auxiliary spring in a tensioned position, said bearing sleeve being effective, when said auxiliary latch is released, to impart torque to said main driving member to assist said main spring in turning said main driving member in said forward direction, a first driving element on said main driving member, a second driving element on said sleeve for making driving contact with said first driving element when said auxiliary latch is released, said first driving element acting on said second driving element to turn said sleeve in a reverse direction during part of the rotation of said main driving member in said reverse direction, and an auxiliary tensioning member pivotally mounted laterally of said main driving element and said bearing sleeve, said auxiliary tensioning member having one portion adapted to be engaged by said first driving element during part of the rotation of said main driving member in said reverse direction and having a second portion adapted to engage said second driving element to turn said sleeve to at least its tensioned position through a greater angle of rotation than said main driving member.

2. A construction as defined in claim 1, further including a shutter release lever and a shutter speed setting member, and characterized by the fact that said releasable main latch is in the form of a double-armed latch lever moved directly by said shutter release lever, and said releasable auxiliary latch is in the form of a double-armed latch lever moved by said shutter release lever through intermediate transmission means under the control of said shutter speed setting member.

3. A construction as defined in claim 1, further including a shutter release lever and a shutter speed setting member, and characterized by the fact that said releasable main latch is in the form of a double-armed latch lever moved directly by said shutter release lever, and said releasable auxiliary latch is in the form of a double-armed latch lever moved by said shutter release lever through at least one intermediate transmission member selectively rendered effective or ineffective under the control of said shutter speed setting member.

4. A construction as defined in claim 2, in which said transmission means includes a double-armed setting lever moved by said shutter speed setting member, and a double-armed intermediate member pivotally mounted on said setting lever and having one arm cooperating with said shutter release lever and another arm cooperating with said auxiliary latch.

5. A construction as defined in claim 2, further including a bulb-exposure locking lever whose position is controlled by said shutter speed setting member, said transmission means including a single armed lever having one portion cooperating with said auxiliary latch, another portion engaging said bulb-exposure locking lever to be positioned thereby, and a third portion lying in the path of travel of said shutter release lever to be moved thereby, when said bulb-exposure locking lever is in one position, and lying out of the patch of travel of said shutter release lever, when said bulb-exposure locking lever is in a different position.

6. A photographic shutter comprising a main driving member mounted for rotation in a forward direction to make an exposure and for rotation in a reverse direction to condition said member ready for a subsequent exposure, a main spring for driving said member, an auxiliary spring selectively effective to assist in driving said member, said auxiliary spring being operatively connected to a rotary bearing sleeve rotatable concentrically with said main driving member, a releasable main latch for holding said main driving member and said main spring in a tensioned position, a releasable auxiliary latch for holding said bearing sleeve and said auxiliary spring in a tensioned position, said bearing sleeve being effective, when said auxiliary latch is released, to impart torque to said main driving member to assist said main spring in turning said main driving member in said forward direction, a driving pin on said main driving member, a driving gear on said rotary bearing sleeve for engagement with said driving pin when said auxiliary latch is released, so that the additional power of said auxiliary spring will be transmitted from said ear to said pin and from said pin to said main driving member to assist in turning said main driving member relatively rapidly, and means effective during the latter part of rotation of said main driving member in said reverse direction for turning said sleeve to a greater extent than said main driving member, so that said ear will be spaced from said pin when both said main driving member and said sleeve are effectively latched by their respective latches.

7. A construction as defined in claim 6, in which said means comprise a pawl and pawl bias means, said pawl being pivotally disposed laterally of said rotary bearing sleeve on a pivotal axis generally parallel to the axis of rotation of said bearing sleeve, and having a first pivot position and a second pivot position, said pawl bias means urging said pawl toward said first pivot position when it is in said second pivot position as well as between said first pivot position and said second pivot position, said pawl further having a member spaced from said pivotal axis, which member, when said pawl is in said first pivot position, is in the path of travel of said driving pin and engageable thereby during said latter part of rotation of said main driving member in said reverse direction for pivoting said pawl from said first pivot position to said second pivot position, and, when said pawl is in said second pivot position, is out of the path of travel of said driving pin and said main driving member, said pawl also having a portion spaced from said pivotal axis and engageable with said driving ear when said pawl is pivoted from said first pivot position to said second pivot position during said latter part of rotation of said main driving member in said reverse direction, whereby, during said later part of rotation of said main driving member in said reverse direction, said driving pin engages said pawl and pivots it from said first pivot position to said second pivot position, and said pawl in traveling from said first pivot position to said second pivot position engages said driving ear and turns said rotary bearing sleeve and thus said auxiliary spring to said tensioned position thereof, and said pawl bias means pivot said pawl from said second pivot position to said first pivot position after release of both said main driving member and said rotary bearing sleeve from their said tensioned positions.

8. A photographic shutter comprising:
 (a) an operating member movable in a forward direction from a cocked position to a run-down position for operating the shutter to make an exposure;
 (b) main spring means for moving said operating member in said forward direction;
 (c) main latch means for holding said operating member in its said cocked position;
 (d) tensioning means for moving said operating member in a reverse direction from said run-down position to at least its said cocked position for thereby tensioning said main spring means;
 (e) auxiliary spring means selectively effective to assist in moving said operating member in said forward direction;
 (f) auxiliary drive means in combination with said auxiliary spring means for tensioning said auxiliary spring means, said auxiliary drive means being movable in said reverse direction from a run-down position to a contact position and then to at least a cocked position, and movable by said auxiliary spring means in said forward direction from said cocked position to said contact position and then to said run-down position;
 (g) driving element means in combination with said operating member, said auxiliary drive means from said run-down position thereof to at least said contact position thereof, but short of said cocked position, being engageable by said driving element means for moving said auxiliary drive means from said run-down position to at least said contact position, but short of said cocked position, simultaneously with the movement of said operating member from its said run-down position toward its said cocked position, and for assisting movement of said operating member from its said cocked position to its said run-down position;
 (h) positioning means engageable by said driving element means when both said auxiliary drive means and said operating member are being moved from the run-down positions thereof toward the cocked positions thereof for moving said driving element means from about said contact position thereof to said cocked position thereof as said operating member moves to at least its said cocked position, said positioning means being out of the path of travel of said auxiliary drive means when moving from said cocked position thereof to said contact position thereof;
 (i) auxiliary latch means for holding said auxiliary drive means in said cocked position thereof; and
 (j) shutter tripping means selectively effective under one condition for releasing only said latch means and effective under another condition for releasing both said latch means.

References Cited

UNITED STATES PATENTS

| | | | |
|---|---|---|---|
| 1,963,324 | 6/1934 | Deckel | 95—63 |
| 2,198,729 | 4/1940 | Junghans | 95—63 |
| 2,925,024 | 2/1960 | Junghans | 95—63 |
| 3,014,418 | 12/1961 | Hahn | 95—63 |
| 3,153,996 | 10/1964 | Rentschler | 95—63 |
| 3,153,998 | 10/1964 | Starp | 95—63 |

JOHN M. HORAN, *Primary Examiner.*